United States Patent [19]

Kashima et al.

[11] Patent Number: 5,737,007
[45] Date of Patent: Apr. 7, 1998

[54] STRUCTURE OF A LASER BEAM SCANNER FOR A PHOTOSENSITIVE PRINTING DEVICE

[75] Inventors: Hiroyuki Kashima, Nagoya; Tsuyoshi Ohashi, Hashima, both of Japan

[73] Assignee: Brother Kogyo Kabushiki Kaisha, Nagoya, Japan

[21] Appl. No.: 433,936

[22] Filed: May 2, 1995

[30] Foreign Application Priority Data

May 23, 1994 [JP] Japan .................. 6-133782

[51] Int. Cl.$^6$ ..................................... B41J 2/47
[52] U.S. Cl. ........................................... 347/250
[58] Field of Search ..................... 347/200, 250, 347/235

[56] References Cited

U.S. PATENT DOCUMENTS 5,019,913  5/1991  Kiya et al. ................. 347/247
5,497,184  3/1996  Saito et al. ................ 347/257

FOREIGN PATENT DOCUMENTS 5-34610  2/1993  Japan .

Primary Examiner—Mark J. Reinhart
Attorney, Agent, or Firm—Oliff & Berridge, PLC

[57] ABSTRACT

In a laser scanner device in which a laser beam emitted from a laser diode is reflected in a main scan direction over a predetermined angle by a polygon mirror which rotates at a high speed, the laser beam is reflected from a flat mirror and received by a horizontal synchronizing detection sensor before the laser beam enters a scanning region in which a main scanning operation of the laser beam is performed to form an electrostatic image on a photosensitive drum. In response to the detection of the laser beam, the detection sensor produces a horizontal synchronizing signal which is used as a reference phase to determine a start phase of the main scanning operation. The laser diode and the horizontal synchronizing detection sensor are disposed proximate to each other so that the first optical axis of the laser beam emitted from the laser diode is located at an angle-retarded side in the rotational direction of the polygon mirror with respect to the second optical axis of the laser beam which is reflected from the polygon mirror and then enters the horizontal synchronizing detection sensor. In addition, the laser diode and the horizontal synchronizing detection sensor are mounted on the same board.

24 Claims, 5 Drawing Sheets

STRUCTURE OF A LASER BEAM SCANNER FOR A PHOTOSENSITIVE PRINTING DEVICE

BACKGROUND OF THE INVENTION

1. Field of the Invention

The invention relates to a laser scanner device and, more particularly, to a laser scanner device in which a signal generating element for generating a horizontal synchronizing signal to determine a main scanning start position of a laser beam is provided on a diode board on which a laser diode for emitting a laser beam is formed.

2. Description of Related Art

A copying machine or laser printer for recording an image with a laser beam has been hitherto provided with a laser scanner device in which a laser beam emitted from a laser diode is reflected in a main scanning direction from a polygonal mirror, such as a regular pentagonal mirror, a regular hexagonal mirror or the like, passed through a lens system and then focused on a photosensitive drum to thereby form an electrostatic latent image on the photosensitive drum.

For example, Japanese Laid-open Patent Application No. Hei-5-34610 proposes an exposure device for an electrophotographic apparatus which is equipped with a laser diode 31 for emitting a laser beam, a regular octagonal polygon mirror 32 which reflects the laser beam emitted from the laser diode 31 in a main scanning direction over a predetermined angle while being rotated at a high speed, and correction lenses 33 and 34. The exposure device as described above is further equipped with a flat mirror 42 for reflecting the laser beam when the phase thereof is coincident with a reference phase for the main scanning, and a horizontal synchronizing detection sensor 36 which is provided away from the laser diode and receives the laser beam reflected from the flat mirror 42 to synchronize the starting positions of respective recording lines with one another. In the exposure device, the laser beam emitted from the laser strikes the polygon mirror 32. The laser beam, which is emitted for recording from the laser diode 31, is passed through the correction lenses 33 and 34 and the reflection mirror 35 and then focused on the photosensitive drum on the basis of the reference position of the laser beam which is detected by the horizontal synchronizing detection sensor 36.

In the exposure device as disclosed in the Japanese Laid-open Patent Application No. Hei-5-34610, the horizontal synchronizing detection sensor 36 is disposed away from the laser diode 31. Therefore, a diode board on which the laser diode 31 is mounted and a sensor board on which the horizontal synchronizing detection sensor 36 is mounted are individually and separately fixed to a frame and wire cords are connected to each of these boards by soldering or the like. As described above, the conventional exposure device needs the mount boards and the wire cords as described. Thus, the number of electronic parts increases and special work to secure the mount boards and to connect the wire cords is required. Therefore, fabrication of the exposure device is more complicated.

SUMMARY OF THE INVENTION

An object of the invention is to provide a laser scanner device in which the number of electronic parts is reduced and the fabrication simplified.

In order to attain the above object, a laser scanner device according to the invention includes a laser diode for emitting a laser beam, a polygon mirror for reflecting the laser beam emitted from the laser diode in a main scanning direction over a predetermined angle while being rotated, on the basis of a scan reference phase, to produce a horizontal synchronizing signal to form a latent image on a photosensitive drum, a lens system having one or plural lenses for focusing the laser beam reflected from the polygon mirror on the photosensitive drum, and a horizontal synchronizing signal generating element which is provided on the diode board having the laser diode formed thereon and receives a laser beam whose phase is coincident with a scan start phase to thereby generate a horizontal synchronizing signal.

In the laser scanning device of the invention, the laser diode is disposed at an angle-retarded side (an upstream side) in the rotational direction of the polygon mirror with respect to the optical axis of the laser beam when the phase thereof is coincident with the scan reference phase.

In the laser scanning device of the invention, through the rotation of the polygon mirror, the laser beam emitted from the laser diode is reflected in the main scanning direction over the predetermined angle on the basis of the scan reference phase for producing the horizontal synchronizing signal, passed through the lens system comprising plural lenses, and then focused on the rotating photosensitive drum, so that a latent image is formed on the photosensitive drum while rotating the photosensitive drum. The horizontal synchronizing signal generating element is disposed on the diode board having the laser diode thereon. It serves to receive the laser beam when the phase thereof is coincident with the scan reference phase and generate the horizontal synchronizing signal.

According to the laser scanner device of the invention, in the laser scanner device having the laser diode, the polygon mirror and the lens system, the horizontal synchronizing signal generating element, which receives the laser beam when the phase thereof is coincident with the scan reference phase and generates the horizontal synchronizing signal, is provided on the diode board having the laser diode formed thereon. Therefore, it is not necessary to separately provide a mount board on which the horizontal synchronizing signal generating element is mounted, and no wire cords are required for the mount board (diode board) having the horizontal synchronizing signal generating element thereon, so that the number of electronic parts can be reduced and the securing work for securing the mount board to the frame and the associated wiring work is omitted. Therefore, the fabrication of the laser scanner device can be simplified.

According to the laser scanner device of the invention, the laser diode is disposed at an angle-retarded side of the polygon mirror in the rotational direction of the polygon mirror with respect to the optical axis of the laser beam, when the phase of the laser beam is coincident with the scan reference phase, so that an open angle between the above optical axis and the optical axis of the laser beam emitted from the laser diode can be set to an extremely acute angle. Therefore, even when there exists an error in distance between the rotational center of the polygon mirror and each mirror surface of the polygon mirror, that is, there exists a dispersion in positional precision between the mirror surfaces of the polygon mirror, the phase shift of the second optical axis of the laser beam can be reduced, and the start position of an electrostatic latent image which is formed on the photosensitive drum every main scanning by each mirror surface can be made substantially uniform.

BRIEF DESCRIPTION OF THE DRAWINGS

A preferred embodiment of the invention will be described in detail with reference to the following figures wherein.

DETAILED DESCRIPTION OF THE PREFERRED EMBODIMENT

A preferred embodiment according to the invention will be described with reference to the accompanying drawings.

The embodiment relates to an example where the invention is applied to a laser printer in which image data transmitted from an external personal computer are recorded through a scanning operation of a laser beam in a main scan direction.

Figure 1:
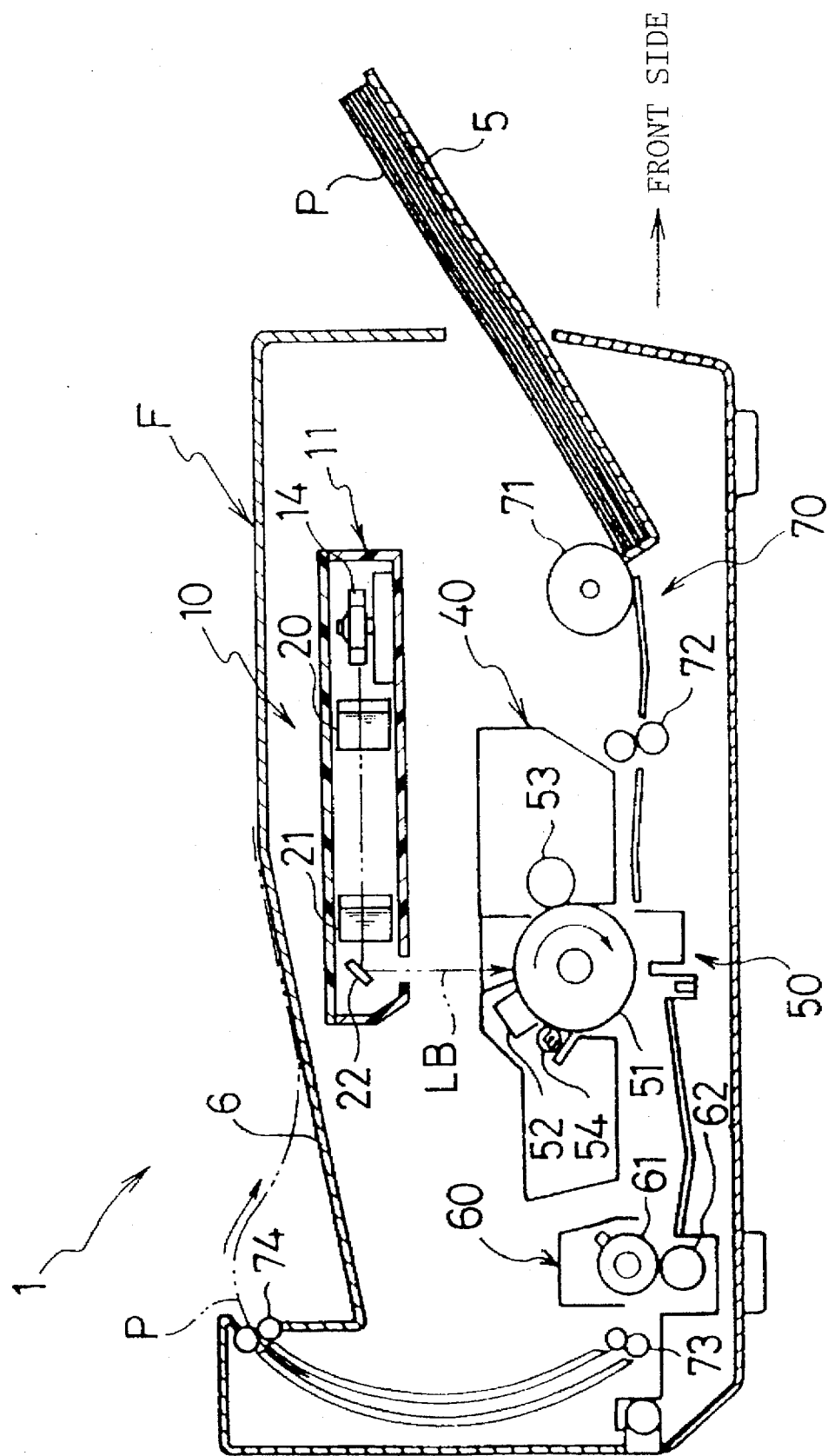
FIG. 1 is a cross-sectional view showing a laser printer.

The laser printer 1, shown in FIG. 1, includes a laser scanner device 10; a process cartridge 40; a transfer/ separation device 50 having a transfer charger and a discharge needle; a fixing device 60 having a fixing roller 61 and a press roller 62; and a feeding device 70 having a sheet feed roller 71, a resist roller 72, a feed roller 73, and a sheet discharge roller 74.

Installed in the process cartridge 40 are a photosensitive drum 51, a primary charger 52, a developing cylinder 53, and an exposure lamp 54.

Figure 2:
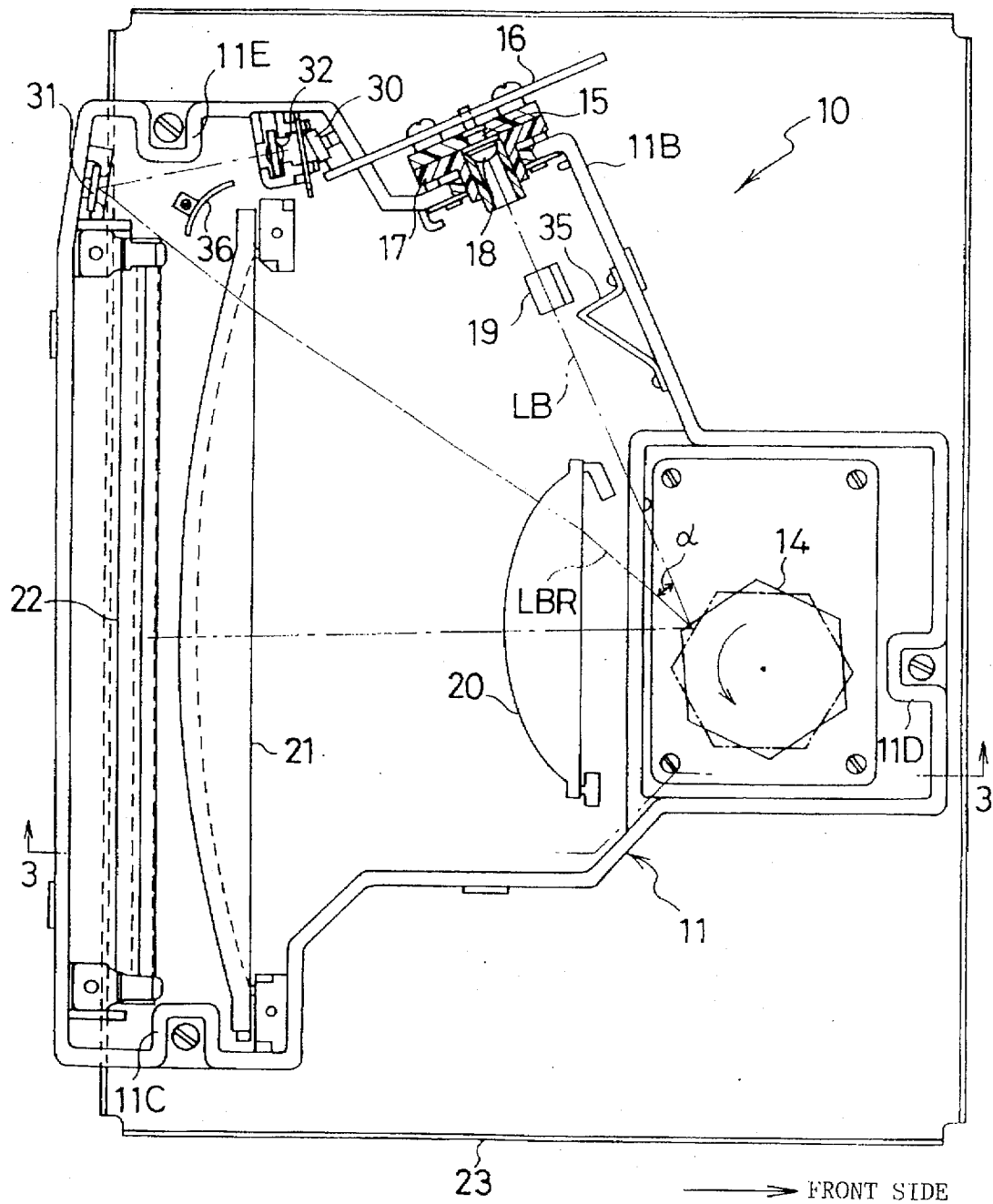
FIG. 2 is a plan view showing a laser scanner device.
Figure 3:
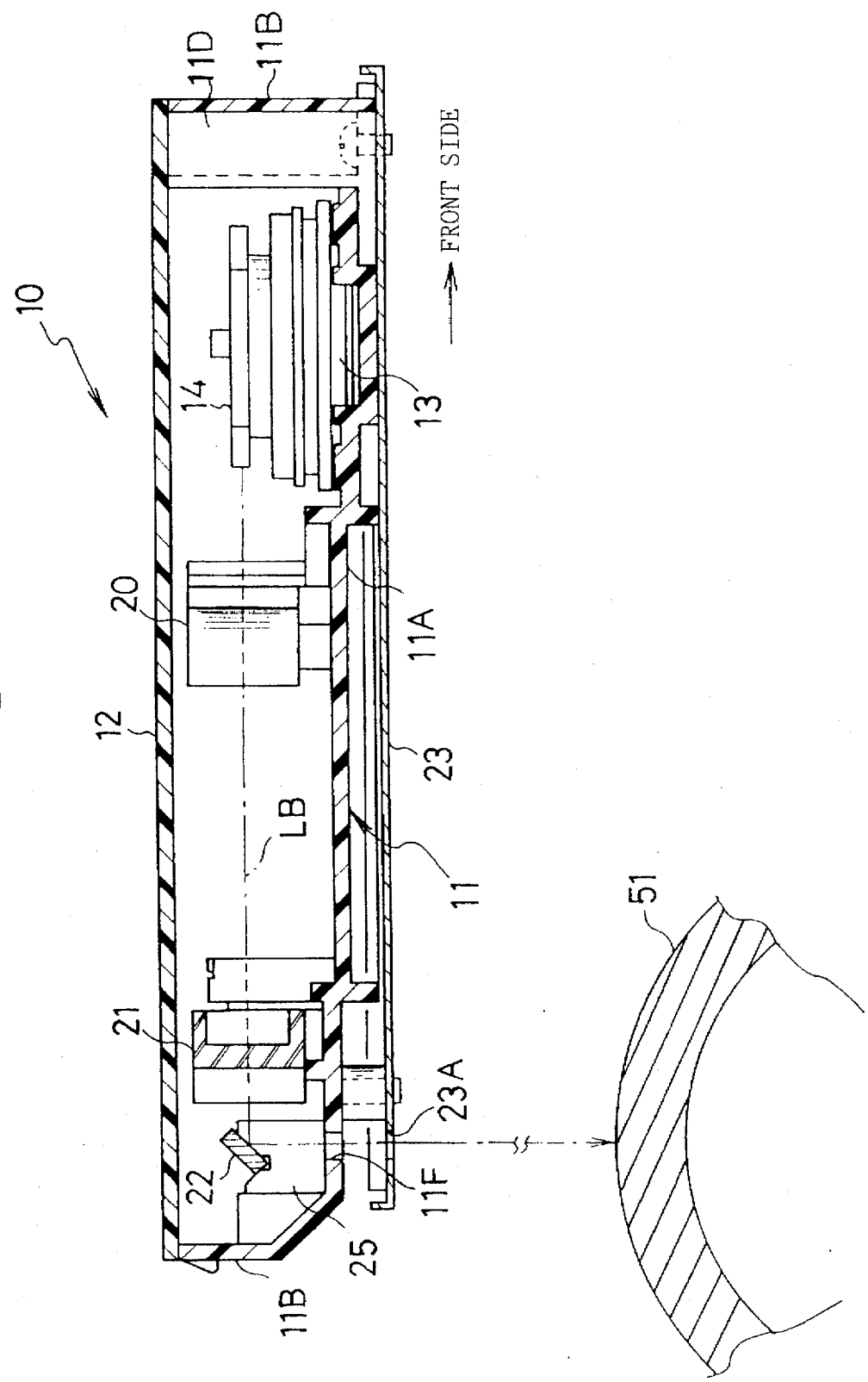
FIG. 3 is a longitudinal-sectional view of the laser scanner shown in FIG. 2, which is taken along 3—3 line of FIG. 2.

Referring to FIGS. 1–3, the laser scanner device 10 has a box-shaped scanner frame 11. The box-shaped scanner frame 11 is integrally formed of a bottom wall 11A and an outer peripheral wall 11B erected from the outer peripheral portion of the bottom wall 11A. A scanner motor 13 is fixed inside of a front end portion (as defined by FIG. 3) of the scanner frame 11 and a hexahedral mirror 14 having a regular hexagonal shape, in section, is fixed to a driving shaft (not shown) of the scanner motor 13 so as to be rotatable in a horizontal plane.

A side portion of the scanner frame 11, which is substantially in the middle portion of the scanner frame 11 in the front-and-rear direction, is partially stepped. A diode board 16, on which a laser diode 15 is mounted, is fixed to the stepped outer peripheral wall 11B so that a laser beam LB is emitted from the laser diode 15 to the hexahedral mirror 14. A support member 17 is secured to the diode board 16, and a collimator lens 18 is provided on the support member 17. A cylinder lens 19 is disposed in the optical direction of the laser beam LB between the collimator lens 18 and the hexahedral mirror 14.

A first F-θ lens 20 and a second F-θ lens 21 are provided at a subsequent stage to the hexahedral mirror 14 in the scanner frame 11 so that the lenses 20,21 are disposed to be symmetrical to the right and left sides of the scanner frame 11 and away from each other at a predetermined interval in the front-and-rear direction. Just behind the second F-θ lens 21 is a reflection mirror 22 which is elongated in the right-and-left direction of the scanner frame 11 and serves to reflect the laser beam LB passing through the second F-θ lens 21 downwardly. The reflection mirror 22 is secured to the scanner frame 11 through fixing members 25 at both right and left end portions thereof. The scanner frame 11 is secured to a fix plate 23, disposed below the scanner frame 11, by three mount portions 11C, 11D and 11E formed in the scanner frame 11. The fix plate 23 is fixed to a main frame F of the laser printer 1 and the scanner frame 11 is covered by a plate-shaped lid member 12.

The laser beam LB which is reflected at the lower portion of the reflection mirror 22 is passed through a rectangular groove (cut-out portion) 11F, which is formed in the bottom wall 11A of the scanner frame 11 so as to be elongated in the right-and-left direction, and a rectangular groove (cut-out portion) 23A formed in the fixed plate 23 and then irradiated onto the photosensitive drum 51 in the process cartridge 40. That is, the first F-θ lens 20 and the second F-θ lens 21 constitute the lens system for focusing and imaging the laser beam LB emitted from the laser diode 15 onto the photosensitive drum 51.

Further, a horizontal synchronizing detection sensor (corresponding to the horizontal synchronizing signal generating element) 30, which comprises a phototransistor for generating a horizontal synchronizing signal or the like, is fixed to the back end portion of the diode board 16 by soldering or the like. The sensor 30 receives, through a focusing lens 32, the laser beam LB reflected from a reflection mirror 31 which is provided to the scanner frame 11 so as to be adjacent to one end of the reflection mirror 22 at the laser diode 15 side. That is, when the laser beam LB, before being irradiated onto the photosensitive drum 51, is passed through the first and second F-θ lenses 20,21, reflected from the reflection mirror 31 and then supplied to the horizontal synchronizing detection sensor 30, the horizontal synchronizing signal is output from the horizontal synchronizing detection sensor 30 to a control device (not shown).

Figure 4:
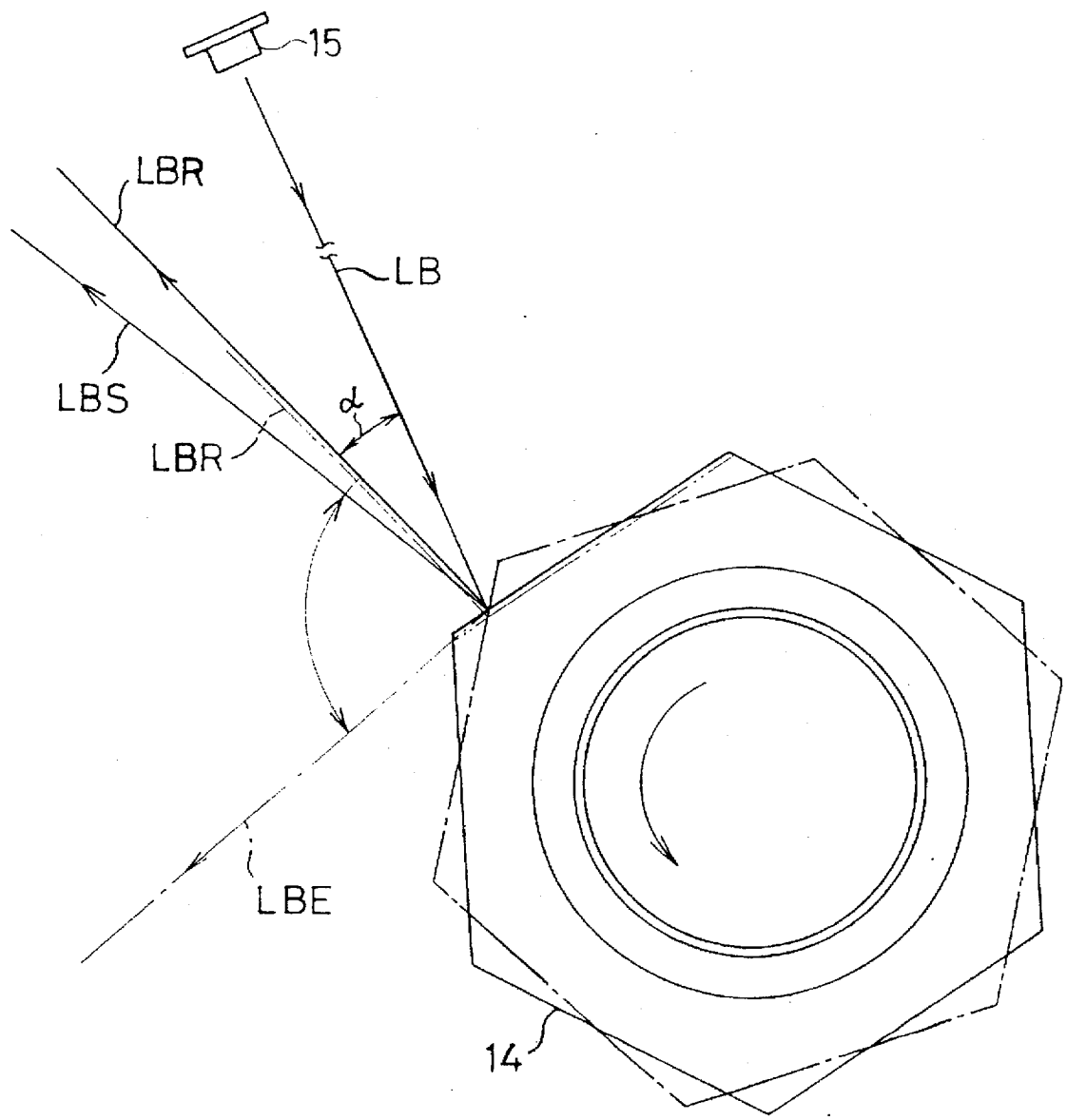
FIG. 4 is a diagram showing a start phase and an end phase of the laser beam in a main scan direction.
Figure 5:
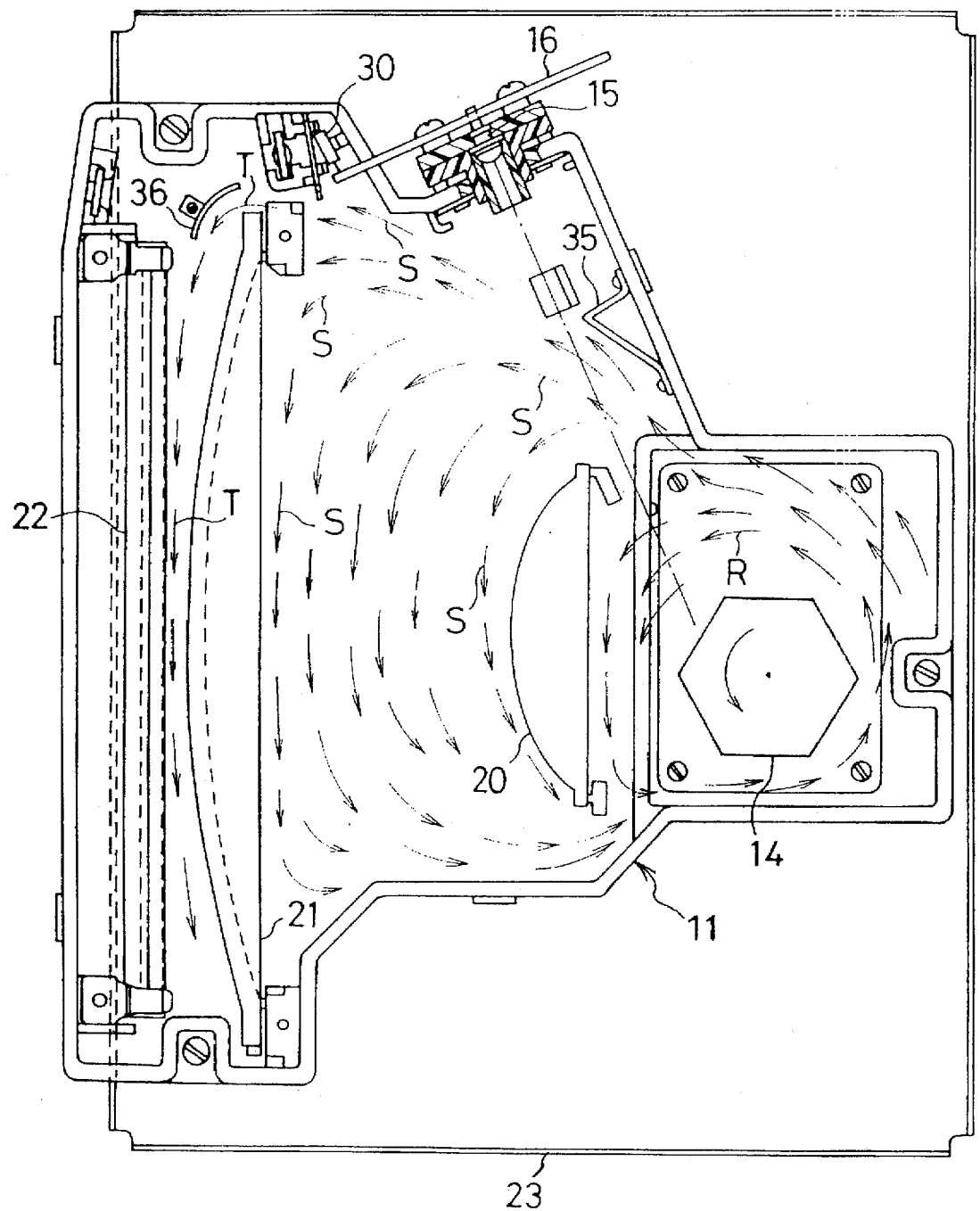
FIG. 5 is a plan view of the laser scanner device of FIG. 2 showing the air flow caused by rotation of the hexagonal mirror.

In operation, the laser beam LB, which is emitted from the laser diode 15, passes through the collimator lens 18, is then irradiated onto the hexahedral mirror 14, and is deflected over a predetermined angle range from each mirror surface of the hexahedral mirror 14, which rotates at a constant high speed (for example, 15,000 rpm), whereby the main scanning operation of the laser beam LB is performed from a scan start phase (as indicted by a laser beam LBS) until a scan end phase (as indicated by a laser beam LBE) of FIG. 4 over the predetermined angle range. The laser beam LB thus deflected is passed through the first and second F-θ lenses 20,21, reflected downwardly from the reflection mirror 22, and then irradiated onto the rotating photosensitive drum 51 to form an electrostatic latent image on the photosensitive drum 51. In this embodiment, a laser beam LBR which is reflected from the hexahedral mirror 14 is reflected from the reflection mirror 31 and then received by the horizontal synchronizing detection sensor 30. The phase (detection timing) of the laser beam LBR is used as a reference phase. The laser scanning operation is controlled by the control device on the basis of the reference phase so that the laser beam LBS at the scan start phase (timing) is output after the lapse of a fixed time from the time when the horizontal synchronizing signal is output from the sensor 30.

The electrostatic latent image on the photosensitive drum 51 is developed with toner which is supplied from the developing cylinder 53 to form a visible toner image on the photosensitive drum 51. The visible image is transferred onto (recorded on) a recording sheet P which is fed from the sheet supply cassette 5 by the feeding device 70. Thereafter, the recording sheet P having the toner image thereon is passed through the fixing device 60 and fed out onto the sheet discharge tray 6 by the rollers 73 and 74.

When the laser beam LB, emitted from the laser diode 15, is reflected in the main scan direction from the scan start phase over the predetermined angle by each mirror surface of the hexahedral mirror 14 rotating at a high speed, the intersection angle α between the first optical axis of the laser beam LB emitted from the laser diode 15 and the second optical axis of the laser beam LBR at the scan reference phase is set to about 25° as shown in FIGS. 2 and 4, and the laser diode 15 is disposed at an angle-retarded side of the hexahedral mirror 14 in the rotational direction with respect to the second optical axis (i.e., at the upstream side of the rotational direction of the hexahedral mirror 14 with respect to the second optical axis in FIG. 4).

In this embodiment, since the horizontal synchronizing detection sensor 30 is secured to the diode board 16 as described above, it is not necessary to provide a special board on which the horizontal synchronizing detection sensor 30 is mounted. The diode 15 and the sensor 30 can be connected to each other through a common print wiring or the like formed on the board 16. Therefore, the number of electronic parts can be reduced, and both the work of securing a special board for the sensor 30 and the associated wiring work can be omitted, so that fabrication of the laser scanner device is simplified.

Further, as described with reference to FIG. 4, the open angle α between the first optical axis of the laser beam LB emitted from the laser diode 15 and the second optical axis of the laser beam LBR whose phase is coincident with the scan reference phase is set to about 25° to greatly reduce the reflection angle. Therefore, even when there exists an error of distance between the rotational center of the hexahedral mirror 14 and each mirror surface of the hexahedral mirror 14, that is, there exists a dispersion in positional precision among the mirror surfaces as shown in FIG. 4, the phase shift of the second optical axis of the laser beam LBS can be reduced (see the laser beam LBR as indicated by a two-dotted chain line). Therefore, the start position of an electrostatic latent image which is formed by each mirror surface every main scanning operation can be made substantially uniform (matched) among the respective mirror surfaces.

The scanner frame 11 of this embodiment is formed of synthetic resin, for example by injecting melted synthetic resin material into a mould. In this case, since each of the mount portions 11C to 11E of the scanner frame 11 is formed at the inner side of the outer peripheral portion of the scanner frame 11, a separation resistance which is applied to the scanner frame 11 of this embodiment when the scanner frame 11 is separated from the mould after the injection molding process is smaller than a scanner frame having mount portions which are formed so as to project from the scanner frame to the outside. Therefore, the scanner frame of this embodiment is prevented from being deformed when it is separated from the mould and a stability in dimension of the scanner frame can be improved. In addition, by forming the mount portions 11C to 11E at the inner side of the scanner frame 11 and so as to be integral with the bottom wall 11A and the outer peripheral wall 11B, it is unnecessary to provide additional mount space. Further, the mount portions 11C to 11E are improved in rigidity so that vibration of the scanner frame 11 due to the high-speed rotation of the hexahedral mirror 14 can be prevented.

When the laser printer 1, as described above, is powered to perform a recording operation in a cold winter season, the fixing heater (not shown), which is provided in the fixing roller 61, is necessarily heated to a high temperature (for example, about 180°) for a short time. Thus, a recording sheet P which is brought into contact with the fixing roller 61 is also heated to a high temperature. As a result, water contained in the recording sheet P is vaporized and diffused as steam in atmosphere. When a large amount of the water (steam) passes through the grooves (cut-out portions) 11F, 23A to invade the scanner frame 11, the invading water is contacts the first F-θ lens 20, the second F-θ lens 21, and/or the reflection mirror 22, which are cool so that dew condensation occurs on the surfaces of the lenses 20, 21 and the reflection mirror 22.

At this time, the high-speed rotation of the hexahedral mirror 14 causes air in the vicinity of the hexahedral mirror 14 to be counterclockwisely circulated in the direction indicated by the arrow R with the hexahedral mirror 14 at the rotational center. As a result, the dew condensation on the front surface of the first F-θ lens 20, which is disposed nearby the hexahedral mirror 14 is readily suppressed by the air flow R. However, the dew condensation on the rear surface of the first F-θ lens 20 and the surfaces of the second F-θ lens 21 and the reflection mirror 22, which are disposed away from the hexahedral mirror 14, are not suppressed because the air flow does not reach these portions. That is, the dew condensation which cannot be suppressed by the air flow causes a reduction in print density and print quality.

In view of the foregoing, a first straightening vane 35 is provided at the side portion of the first F-θ lens 20 so as to be spaced from the first F-θ lens 20 at a distance to effectively direct a part of the air flow R to the rear surface of the first F-θ lens 20 (between the rear surface of the first F-θ lens 20 and the front surface of the second F-θ lens 21) to thereby form an air flow indicated by the arrows S. In addition, a second straightening vane 36 is provided at the side portion of the second F-θ lens 21 so as to be spaced from the second F-θ lens 21 at a distance to effectively direct a part of the air flow S to a gap between the reflection mirror 22 and the second F-θ lens 21 to thereby form the air flow indicated by the arrow T. The first and second straightening vanes are disposed so that the vanes do not disturb the main scanning operation of the laser beam LB.

With this arrangement, the air flow as indicated by the arrows S is generated in the gap between the first and second F-θ lenses 20,21 by the first straightening vane 35, and the air flow as indicated by the arrow T is generated in the gap between the second F-θ lens 21 and the reflection mirror 22 by the second straightening vane 36, whereby the dew condensation on the first and second F-θ lenses 20 and 21 and the reflection mirror 22 can be effectively suppressed. Therefore, the reduction in print density and print quality due to the dew condensation can be avoided.

In the embodiment as described above, the open angle α between the first optical axis of the laser beam LB and the second optical axis of the laser beam LBR, whose phase is coincident with the scan reference phase, may be set to any angle of about 30° or less. The invention is not limited to the above embodiment, and on the basis of existing techniques or techniques which are obvious to a skilled person in the art, various modifications may be made to each device and each means of the embodiment as described above without departing from the subject matter of the invention. Further, the invention is also applicable to various laser scanner devices such as a copying machine, a laser facsimile, and similar printing devices in which an image is recorded on a recording sheet P following a laser beam LB emitted from the laser diode 15 being scanned in a main scan direction.

What is claimed is:

1. A laser scanner device, comprising:
   a laser diode for emitting a laser beam;
   a polygon mirror for reflecting the laser beam emitted from said laser diode in a main scan direction over a predetermined angle on the basis of a scan reference phase for producing a horizontal synchronizing signal while being rotated, thereby forming a latent image on a photosensitive drum;

at least one lens for focusing the laser beam reflected from said polygon mirror onto said photosensitive drum; and a horizontal synchronizing signal generating element which is provided on a diode substrate on which said laser diode is mounted and receives the laser beam to generate a horizontal synchronizing signal when the phase thereof is coincident with the scan reference phase, wherein said laser diode is upstream of said horizontal synchronizing signal generating element relative to a rotational direction of said polygon mirror.

2. The laser scanner device according to claim 1, wherein said laser diode is disposed at an angle-retarded side in the rotational direction of said polygon mirror with respect to an optical axis of the laser beam whose phase is coincident with the scan reference phase.

3. The laser scanner device according to claim 1, wherein an open angle α between a first optical axis of the laser beam emitted from said laser diode and a second optical axis of the laser beam whose phase is coincident with the scan reference phase is set to 30° or less.

4. The laser scanner device according to claim 3, wherein the open angle α between the first optical axis and the second optical axis is set to 25°.

5. The laser scanner device according to claim 1, further comprising:

a scanner frame for supporting said diode board, said polygon mirror and said lens; and a fix plate which is disposed below said scanner frame and through which the laser beam reflected from said polygon mirror is passed.

6. The laser scanner device according to claim 5, wherein said scanner frame comprises a bottom portion, an outer peripheral portion and a mount portion through which said scanner frame is fixed to said fix plate.

7. The laser scanner device according to claim 6, wherein said mount portion through which said scanner frame is fixed to said fix plate is provided at an inner side of said outer peripheral portion of said scanner frame.

8. The laser scanner device according to claim 6, wherein said scanner frame is formed of synthetic resin and said mount portion is formed with said bottom portion and said outer peripheral portion of said scanner frame by an injection molding process.

9. The laser scanner device according to claim 1, further comprising at least one straightening vane which is provided in said scanner frame to produce air flow in a prescribed direction.

10. The laser scanner device according to claim 9, wherein said at least one lens comprises a first lens and a second lens through which the laser beam reflected from said polygon mirror is focused on said photosensitive drum, a first straightening vane for producing air flow in a first space at the polygon mirror side of said first lens, and a second straightening vane for producing air flow in a second space opposite to the first space.

11. The laser scanner device according to claim 10, wherein said first and second straightening vanes are disposed away from each other at a distance so that said first and second straightening vanes do not disturb a main scanning operation of the laser beam.

12. A laser scanner device for a printer, comprising:

a scanner frame having a base and peripheral walls, an elongated slit formed in said base for allowing passage of a laser beam;

a circuit board mounted to a wall of said peripheral walls;

a polygonal mirror rotatably mounted in an end of said scanner frame away from the elongated slit;

a laser beam focusing system for directing the laser beam onto a photosensitive surface of the printer;

a laser emitter for emitting the laser beam, said laser emitter mounted to said circuit board; and a beam synchronizing signal generating element mounted to the circuit board to receive the laser beam and generate a synchronizing signal when receiving the laser beam, said laser emitter is upstream of the beam synchronizing signal generating element relative to the direction of rotation of said polygonal mirror.

13. The laser scanner device according to claim 12, where said base and said peripheral walls of said scanner frame are formed integrally by molding and further comprise a plurality of mounting portions defined by recesses in said peripheral walls.

14. The laser scanner device according to claim 12, wherein said laser beam focusing system comprises:

at least one F-θ focusing lens; and a first reflection mirror.

15. The laser scanner device according to claim 14, wherein said at least one F-θ focusing lens comprises two F-θ focusing lenses spaced apart from one another and said first reflection mirror is spaced apart from the second F-θ focusing lens in a downstream direction of a path of the laser beam.

16. The laser scanner device according to claim 14, further comprising at least one straightening vane mounted to said scanner frame to deflect air flow generated by rotation of said polygonal mirror to pass the deflected air over surfaces of said at least one F-θ focusing lens and said first reflection mirror.

17. The laser scanner device according to claim 15, further comprising a pair of straightening vanes mounted to said scanner frame to deflect air flow generated by rotation of said polygonal mirror, a first straightening vane of said pair of straightening vanes deflecting air between said two F-θ focusing lenses and a second straightening vane of said pair of straightening vanes deflecting air between the second F-θ focusing lens of said two F-θ focusing lenses and said first reflection mirror.

18. The laser scanner device according to claim 14, wherein said circuit board mounting said laser emitter and said beam synchronizing signal generating element is upstream in a direction of rotation of said polygonal mirror.

19. The laser scanner device according to claim 18, further comprising a second reflection mirror mounted to an inner surface of said peripheral walls proximate an end of said first reflection mirror, said second reflection mirror reflecting the laser beam to said beam synchronizing signal generating element.

20. The laser scanner device according to claim 19, wherein an angle between the laser beam emitted by said laser emitter and the laser beam reflected from said polygonal mirror to said second reflection mirror is less than 30°.

21. The laser scanner device according to claim 20, wherein the angle is 25°.

22. A laser scanner device, comprising:

a laser diode for emitting a laser beam;

a polygon mirror for reflecting the laser beam emitted from said laser diode in a main scan direction over a predetermined angle on the basis of a scan reference phase for producing a horizontal synchronizing signal while being rotated, thereby forming a latent image on a photosensitive drum;

at least one lens for focusing the laser beam reflected from said polygon mirror onto said photosensitive drum;

a horizontal synchronizing signal generating element which is provided on a diode substrate on which said laser diode is mounted and receives the laser beam to generate a horizontal synchronizing signal when the phase thereof is coincident with the scan reference phase, wherein said laser diode is upstream of said horizontal synchronizing signal generating element relative to a rotational direction of said polygon mirror; and at least one straightening vane provided in said scanner frame to direct air flow in a prescribed direction.

23. The laser scanner device according to claim 22, wherein said at least one lens comprises a first lens and a second lens through which the laser beam reflected from said polygon mirror is focused on said photosensitive drum, a first straightening vane for producing air flow in a first space at the polygon mirror side of said first lens, and a second straightening vane for producing air flow in a second space opposite to the first space.

24. The laser scanner device according to claim 23, wherein said first and second straightening vanes are disposed away from each other at a distance so that said first and second straightening vanes do not disturb a main scanning operation of the laser beam.

* * * * *